United States Patent
Kimura

(10) Patent No.: US 12,112,580 B2
(45) Date of Patent: Oct. 8, 2024

(54) LIFE PREDICTING DEVICE FOR VEHICLE COMPONENT

(71) Applicant: TOYOTA JIDOSHA KABUSHIKI KAISHA, Toyota (JP)

(72) Inventor: Shigeru Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 17/478,248

(22) Filed: Sep. 17, 2021

(65) Prior Publication Data

US 2022/0130179 A1    Apr. 28, 2022

(30) Foreign Application Priority Data

Oct. 23, 2020    (JP) .................................. 2020-178426

(51) Int. Cl.
*G07C 5/00*    (2006.01)
*G07C 5/08*    (2006.01)

(52) U.S. Cl.
CPC ........... *G07C 5/006* (2013.01); *G07C 5/0808* (2013.01); *G07C 5/085* (2013.01)

(58) Field of Classification Search
CPC ...... G07C 5/006; G07C 5/085; G07C 5/0808; G05B 23/0283; G05B 2219/2637
See application file for complete search history.

(56) References Cited

U.S. PATENT DOCUMENTS

| 2008/0216576 | A1* | 9/2008 | Eckert | H02K 11/25 |
| | | | | 73/592 |
| 2013/0197821 | A1* | 8/2013 | Maeda | H02K 11/21 |
| | | | | 702/34 |
| 2017/0321765 | A1* | 11/2017 | Ruiters | F16D 48/02 |
| 2019/0203729 | A1 | 7/2019 | Nishimura | |
| 2021/0102999 | A1 | 4/2021 | Hamakubo et al. | |
| 2021/0146731 | A1* | 5/2021 | Kanbayashi | B60C 11/243 |

FOREIGN PATENT DOCUMENTS

| CN | 107635842 A | 1/2018 | |
| DE | 102006009529 A1 * | 9/2007 | ............. H02P 29/02 |
| JP | 2016-35627 A | 3/2016 | |
| JP | 2019-122065 A | 7/2019 | |

(Continued)

OTHER PUBLICATIONS

Machine Translation of description of WO-2006120004-A2, Nov. 2006, pp. 1-5 (Year: 2006).*

(Continued)

*Primary Examiner* — Anne Marie Antonucci
*Assistant Examiner* — Jared C Bean
(74) *Attorney, Agent, or Firm* — Oblon, McClelland, Maier & Neustadt, L.L.P.

(57) ABSTRACT

An interference margin between a stator and a rotor is measured after a rotary electric machine is manufactured, and the measured value is stored in a memory of a life predicting device as an allowable limit value. The life predicting device calculates a wear amount of a bearing portion of the rotary electric machine from an operation state amount of the rotary electric machine, and determines whether or not the rotary electric machine reaches an end of a life and maintenance is needed based on the calculated value and the allowable limit value stored in the memory.

4 Claims, 4 Drawing Sheets

(56) References Cited

FOREIGN PATENT DOCUMENTS

| | | | |
|---|---|---|---|
| JP | 2019-183823 A | 10/2019 | |
| JP | 2020-67391 A | 4/2020 | |
| JP | 2020-84641 A | 6/2020 | |
| WO | WO-2006120004 A2 * | 11/2006 | ............. F16H 57/01 |
| WO | WO 2016/184568 A1 | 11/2016 | |

OTHER PUBLICATIONS

Machine translation of the description of DE-102006009529-A1, Zienicke et al., pp. 1-8 (Year: 2013).*

* cited by examiner

LIFE PREDICTING DEVICE FOR VEHICLE COMPONENT

CROSS-REFERENCE TO RELATED APPLICATION

This application claims priority to Japanese Patent Application No. 2020-178426 filed on Oct. 23, 2020, incorporated herein by reference in its entirety.

BACKGROUND

1. Technical Field

The present disclosure relates to a life predicting device for a vehicle component that predicts a life of a vehicle component due to aged deterioration, such as wear and fatigue.

2. Description of Related Art

In a vehicle, the life and remaining life of a vehicle component that configures the vehicle may be predicted from a usage status thereof, and a repair and replacement notification may be given before the life expires. Japanese Unexamined Patent Application Publication No. 2019-183823 (JP 2019-183823 A) discloses predicting the life of the vehicle component based on a usage environment of the vehicle, the climate, and the change in the component characteristic from the time of manufacture.

SUMMARY

By the way, there is an individual difference in the resistance to the aged deterioration of the vehicle component due to a processing variation in a dimensional shape or a material. On the other hand, in a case where a longer life than originally expected is predicted, the vehicle component may be damaged due to the aged deterioration before notification of repair and replacement. Therefore, the life predicting device in the related art predicts the life by assuming the individual with the lowest resistance to the aged deterioration within a tolerance range, and in most of the vehicle components actually used, a shorter life than originally expected is estimated.

A life predicting device for a vehicle component according to an aspect of the present disclosure is a device that predicts a life of a vehicle component that is a component of a vehicle, and includes an execution device and a storage device. Here, a value indicating a progress degree of the aged deterioration of the vehicle component is defined as a deterioration degree, a value of the deterioration degree when the vehicle component reaches an end of the life is defined as an allowable limit value of the deterioration degree, and a value indicating a characteristic of each individual vehicle component is defined as an individual characteristic value. A value of the allowable limit value obtained from a measurement result of the individual characteristic value of the individual vehicle component that is a target of life prediction by the life predicting device is stored in the storage device in the life predicting device in advance. The execution device in the life predicting device executes acquisition processing of acquiring an operation state amount of the vehicle component in the vehicle, calculation processing of calculating the value of the deterioration degree based on a value of the operation state amount, and output processing of generating information regarding the life of the vehicle component based on the deterioration degree and the allowable limit value and outputting the generated information.

The execution device in the life predicting device acquires the operation state amount of the vehicle component and calculates the deterioration degree of the vehicle component from the operation state amount. Then, the execution device generates the information regarding the life of the vehicle component based on the calculated deterioration degree and the allowable limit value stored in advance in the storage device is generated and outputs the generated information. The deterioration degree indicates the progress degree of the aged deterioration of the vehicle component, and the allowable limit value indicates the value of the deterioration degree when the vehicle component reaches the end of its life. Therefore, by comparing a current value of the deterioration degree with the allowable limit value, the remaining life of the vehicle component or a time when the vehicle component reaches the end of its life, and the like can be predicted.

In the life predicting device, a value of the allowable limit value stored in the storage device is a value obtained from a measurement result of the individual characteristic value of the individual vehicle component that is a target of the life prediction by the life predicting device. Therefore, in the life predicting device, the information regarding the life is generated in a form in which the resistance of the individual to the aged deterioration is reflected while there is an individual variation in resistance to the aged deterioration. Therefore, with the life predicting device for the vehicle component, the accuracy of the life prediction for the vehicle component can be improved.

In the life predicting device for the vehicle component, in the output processing, a result of necessity determination of maintenance of the vehicle component may be output as the information regarding the life. The necessity determination may be performed by setting a difference obtained by subtracting a margin from the allowable limit value as a determination threshold value, determining that maintenance is needed in a case where the value of the deterioration degree is the determination threshold value or more, and determining that maintenance is not needed in a case where the value of the deterioration degree is less than the determination threshold value. In such a case, the necessity determination of maintenance can be performed in a form in which the individual difference in the allowable limit value due to the processing variation is reflected.

Even in a case where notification is given that maintenance of the vehicle component is needed, it is not always a status in which the vehicle can be brought into maintenance immediately. Therefore, a sufficient grace period is needed from the determination that maintenance is needed until the vehicle component actually reaches the end of its life. The length of the grace period can be adjusted to some extent by the value of the margin. However, even in a case where the value of the margin is fixed, the grace period is shortened as the progress rate of the aged deterioration after the determination is made that maintenance is needed, that is, the increase rate of the deterioration degree of vehicle component is high. On the other hand, the margin may be a variable value set based on an increase rate of the deterioration degree as a value that increases when the increase rate is large as compared to when the increase rate is small. In a case where the increase rate of the deterioration degree until the determination is made that maintenance is needed is high, there is a high possibility that the increase rate of the deterioration degree continues to be high thereafter. Therefore, in a case where the margin is variably set as described above, a sufficient grace period can be easily secured.

In a hybrid vehicle and an electric vehicle, a rotary electric machine is mounted as a drive source. In such a rotary electric machine, a bearing portion of a rotor may be worn and the rotor may interfere with a stator. In a case where the vehicle component that is a target of the life prediction is the rotary electric machine, a wear amount of the bearing portion of the rotor of the rotary electric machine is used as the deterioration degree, an interference margin between the rotor and the stator of the rotary electric machine is used as an individual characteristic value, the life predicting device described above can be configured as a device that predicts a life of the rotary electric machine until the rotor interferes with the stator.

Even in a case where an operating condition of the vehicle component is the same, the individual difference due to the processing variation may occur in the progress rate of the aged deterioration, that is, the increase rate of the deterioration degree. In a case where the life predicting device is configured as follows, the life predicting device can be reflected in the calculation of the deterioration degree that reflects the individual difference in the increase rate of the deterioration degree. That is, in the life predicting device, the individual characteristic value may include a characteristic value for allowable limit value calculation used for calculating the allowable limit value and a characteristic value for deterioration degree calculation used for calculating the deterioration degree, a value of the characteristic value for deterioration degree calculation measured before the vehicle component is assembled into the vehicle may be stored in the storage device in advance, and calculation of the deterioration degree in the calculation processing may be performed based on the operation state amount and the characteristic value for deterioration degree calculation. For example, in a case where the life of the magnet-embedded rotary electric machine until the rotor interferes with the stator due to the wear of the bearing portion of the rotor is predicted, a wear amount of a bearing portion of a rotor of the rotary electric machine may be used as the deterioration degree, an interference margin between a stator of the rotary electric machine and the rotor may be used as the characteristic value for allowable limit value calculation, and a mechanical imbalance amount of the rotor and a variation amount of a magnetic flux density between magnetic poles provided in the rotor may be used as the characteristic value for deterioration degree calculation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
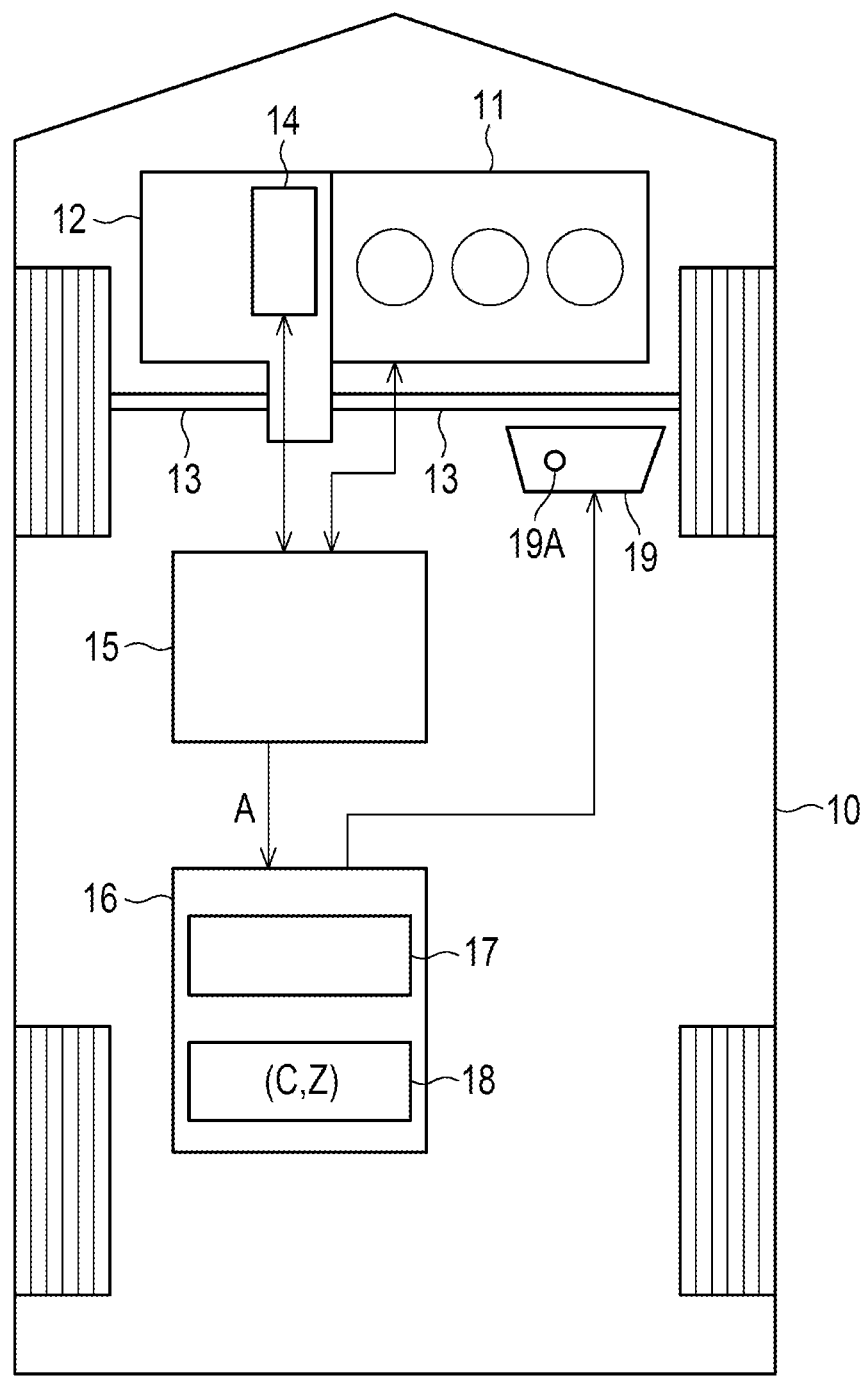
FIG. 1 is a diagram schematically showing a configuration of a life predicting device for a vehicle component according to a first embodiment.
Figure 2:
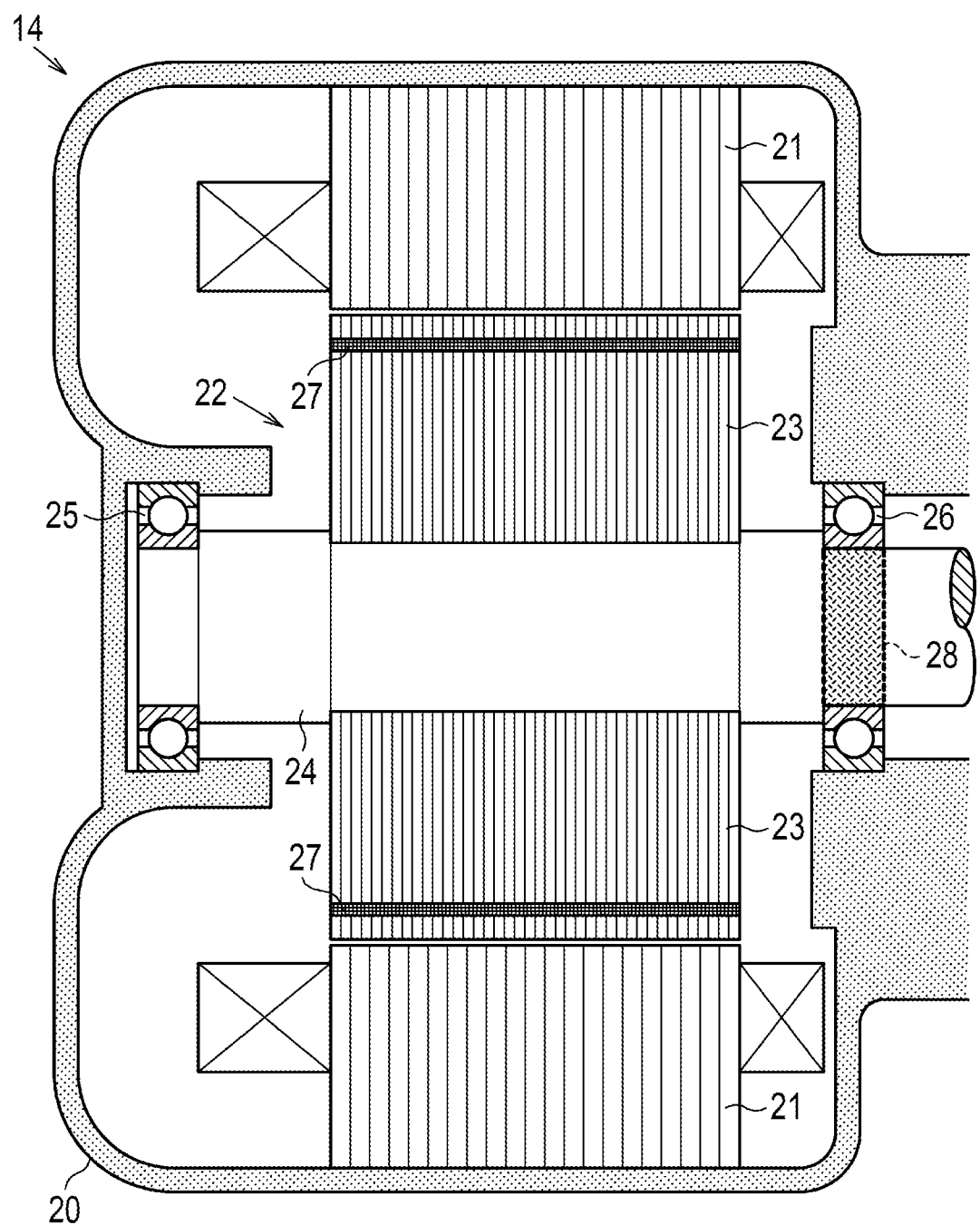
FIG. 2 is a cross-sectional view of a rotary electric machine including a rotor that is a target of the life prediction in the first embodiment.

Hereinafter, a first embodiment of a life predicting device for a vehicle component will be described in detail with reference to FIGS. 1 to 3.

Configuration of Life Predicting Device

First, with reference to FIG. 1, a configuration of a drive system of a hybrid vehicle 10 on which a life predicting device 16 according to the present embodiment is mounted will be described. An engine 11 is mounted on the hybrid vehicle 10. The engine 11 is connected to a wheel shaft 13 via a transaxle 12. The transaxle 12 is installed with a rotary electric machine 14 that functions as an electric motor that generates a power transmitted to the wheel shaft 13 and also functions as an electric power generator that receives power transmitted from the engine 11 or the wheel shaft 13 to generate an electric power. Also, the hybrid vehicle 10 includes an electronic control unit 15 for vehicle control. The electronic control unit 15 controls the torque of the engine 11 and the rotary electric machine 14 as part of vehicle control.

The life predicting device 16 according to the present embodiment is mounted on the hybrid vehicle 10. The life predicting device 16 is configured as a microcomputer including a calculation processing circuit 17 as an execution device and a memory 18 as a storage device. The electronic control unit 15 is connected to the life predicting device 16. The life predicting device 16 is also connected to an instrument panel 19 of the hybrid vehicle 10. The instrument panel 19 is installed with a warning light 19A that notifies a user that maintenance of the vehicle component is needed.

Configuration of Rotary Electric Machine

Next, a configuration of the rotary electric machine 14 will be described with reference to FIG. 2. The rotary electric machine 14 is installed inside a case 20 of the transaxle 12.

The rotary electric machine 14 includes an annular pillar-shaped stator 21 fixed to the case 20 and a rotor 22 positioned on an inner side of the stator 21 in a radial direction. The rotor 22 has a cylindrical rotor core 23 formed of stacked electromagnetic steel sheets, and a rotor shaft 24 that penetrates a center portion of the rotor core 23. The rotor shaft 24 is rotatably supported by the case 20 by two bearings 25, 26 disposed with the rotor core 23 interposed therebetween. Further, a plurality of permanent magnets 27 that forms magnetic poles is embedded in the rotor core 23. The rotor shaft 24 is coupled to a power transmission path of the hybrid vehicle 10 at a portion on the right side in the drawing.

The portion of the rotor shaft 24 on the right side of the rotor core 23 in the drawing receives a torsional load when the rotary electric machine 14 outputs the torque to the outside. An inner ring of the bearing 26 is press-fitted into an outer circumferential surface of the rotor shaft 24, and such a torsional load may cause a minute relative displacement between contact surfaces of the bearing 26 and the rotor shaft 24. The inner ring of the bearing 26 is formed of a material having a hardness significantly higher than that of the rotor shaft 24. Therefore, the outer circumferential surface of the rotor shaft 24 is mainly worn due to the minute relative displacement between the contact surfaces as described above. In the following description, a portion in which the bearing 26 is press-fitted on the outer circumferential surface of the rotor shaft 24 will be referred to as a bearing portion 28 of the rotor shaft 24. As the wear of the bearing portion 28 progresses, the axial runout of the rotor shaft 24 increases, and the rotor core 23 interferes with the stator 21. That is, when the wear amount of the bearing portion 28 reaches an amount at which the rotor core 23 interferes with the stator 21, the rotary electric machine 14 reaches the end of its life.

The life predicting device 16 according to the present embodiment is configured as a device that predicts that the rotary electric machine 14 reaches the end of its life due to the wear of the bearing portion 28 and warns that maintenance of the rotary electric machine 14 is needed. In the present embodiment, the rotary electric machine 14 corresponds to a vehicle component that is the target of the life prediction. Also, the wear of the bearing portion 28 corresponds to the aged deterioration of the rotary electric machine 14.

About Life Prediction for Rotary Electric Machine

Subsequently, the life prediction of the rotary electric machine 14 in the life predicting device 16 according to the present embodiment will be described.

At a manufacturing plant of the rotary electric machine 14, the following characteristic values are measured for each individual manufactured rotary electric machine 14. That is, the characteristic values are parameters of an inner diameter B1 of the stator 21, an outer diameter B2 of the rotor core 23, a coaxiality B3 of the stator 21 and the rotor core 23, a mechanical imbalance amount C1 of the rotor 22, and a variation amount C2 of a magnetic flux density between magnetic poles of the rotor 22. These values differ for the individual rotary electric machine 14 due to the processing variation, such as a dimensional shape or a material. In the following description, these values indicating the characteristics of each rotary electric machine 14 will be referred to as individual characteristic values.

A difference (B1−(B2+B3)) obtained by subtracting the sum of the outer diameter B2 of the rotor core 23 and the coaxiality B3 of the stator 21 and the rotor core 23 from the inner diameter B1 of the stator 21 is an interference margin between the stator 21 and the rotor core 23 in a state immediately after the rotary electric machine 14 is manufactured. On the other hand, as the outer diameter of the bearing portion 28 of the rotor shaft 24 decreases due to the wear, the coaxiality of the stator 21 and the rotor core 23 increases accordingly. Therefore, as an amount of decrease in the outer diameter of the bearing portion 28 due to the wear reaches the interference margin between the stator 21 and the rotor core 23 in the state immediately after the rotary electric machine 14 is manufactured, the rotor core 23 interferes with the stator 21. In the following description, the amount of decrease in the outer diameter of the bearing portion 28 due to wear will be referred to as a wear amount X of the bearing portion 28. In the present embodiment, the wear amount X is a parameter corresponding to the deterioration degree that is a value indicating the progress degree of the aged deterioration.

The interference margin between the stator 21 and the rotor core 23 in the state immediately after the rotary electric machine 14 is manufactured is the value of the wear amount X when the rotary electric machine 14 reaches the end of its life. In the following description, the value of the wear amount X when the rotary electric machine 14 reaches the end of its life is described as an allowable limit value Z of the wear amount X. As described above, the inner diameter B1 of the stator 21, the outer diameter B2 of the rotor core 23, and the coaxiality B3 of the stator 21 and the rotor core 23 are the individual characteristic values, and thus the allowable limit value Z also differ for each individual rotary electric machine 14.

In this way, the measured values of B1, B2, B3 are used for calculating the allowable limit value Z. In the following description, the individual characteristic value used for calculating the allowable limit value Z will be described as a characteristic value B for allowable limit value calculation. On the other hand, C1, C2 are used for calculating the wear amount X. In the following description, the individual characteristic value used for calculating the wear amount X will be described as a characteristic value C for deterioration degree calculation.

Then, at the manufacturing plant of the rotary electric machine 14, a form representing the values of the allowable limit value Z obtained by measuring the individual characteristic value and the characteristic value C for deterioration degree calculation with a two-dimensional bar code or the like is attached to the rotary electric machine 14, and the rotary electric machine 14 is shipped. Then, at an assembly plant of the hybrid vehicle 10, when the rotary electric machine 14 is assembled into the vehicle, the values of the allowable limit value Z and the characteristic value C for deterioration degree calculation are read from the attached form. Then, the read values are written in the memory 18 of the life predicting device 16 mounted on the vehicle into which the rotary electric machine 14 is assembled. As described above, in the memory 18 of the life predicting device 16, the allowable limit value Z and the characteristic value C for deterioration degree calculation for the individual rotary electric machine 14 that is the target of the life prediction are stored at the time of assembly of the hybrid vehicle 10.

On the other hand, as described above, the life predicting device 16 predicts the life of the rotary electric machine 14 in the hybrid vehicle 10 assembled in this way, and gives a warning before the rotary electric machine 14 reaches the end of its life. The processing related to the life prediction and the warning is performed by the calculation processing circuit 17 reading and executing the program stored in the memory 18 in advance.

Figure 3:
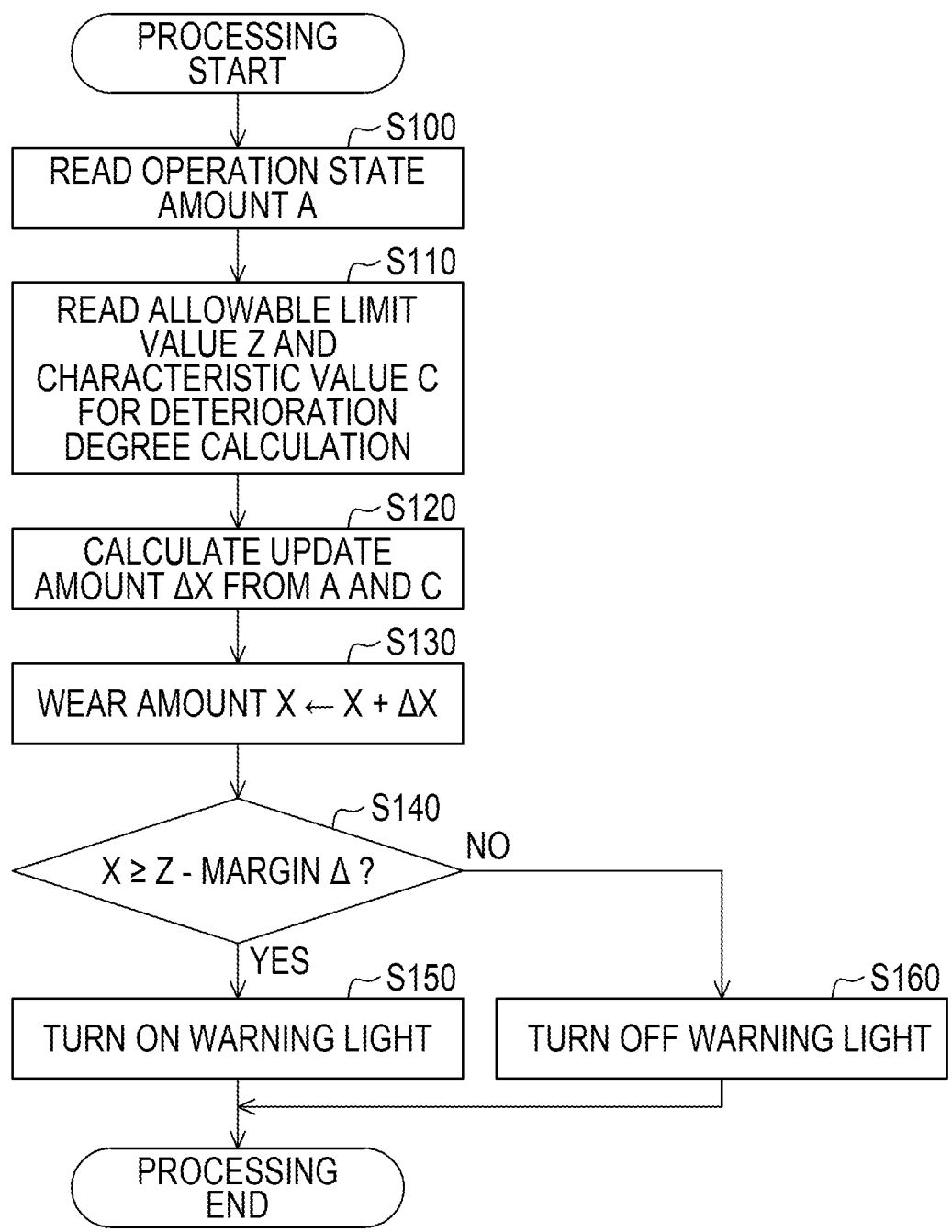
FIG. 3 is a flowchart of processing executed by the life predicting device according to the first embodiment.

FIG. 3 shows a flowchart of the processing related to the life prediction of the rotary electric machine 14 and the warning. While the hybrid vehicle 10 is starting up, the calculation processing circuit 17 repeatedly executes a series of processing shown in FIG. 3 at predetermined control cycles.

When the processing in a current control cycle is started, first, in step S100, an operation state amount A indicating an operation state of the rotary electric machine 14 is read from the electronic control unit 15. In the present embodiment, five values of a rotation speed A1 of the rotary electric machine 14, a current value A2 of a stator current, an advance quantity A3 of the stator current, an amount A4 of oil supplied to the bearing portion 28, and a temperature A5 of the oil are read as the operation state amount A. In the case of the present embodiment, the oil stored in the case 20 is scattered by the rotation of the rotating component of the transaxle 12 and is transmitted to the bearing portion 28. Therefore, the amount A4 of the oil supplied to the bearing portion 28 increases as the input rotation speed of the transaxle 12 is high. Therefore, in the present embodiment, the amount A4 of the oil supplied is obtained from the input rotation speed of the transaxle 12. Further, the temperature A5 of the oil can be obtained by directly measuring the temperature by installing an oil temperature sensor on the transaxle 12 or estimating the temperature based on the elapsed time after the hybrid vehicle 10 is started up.

Subsequently, in step S110, the values of the allowable limit value Z and the characteristic value C for deterioration degree calculation stored in the memory 18 at the time of assembly of the hybrid vehicle 10 are read. Then, in step S120, a value of an update amount $\Delta X$ is calculated based on the operation state amount A and the characteristic value C for deterioration degree calculation. The update amount $\Delta X$ indicates an amount of increase in the wear amount X in the period from a previous control cycle to the current control cycle.

The update amount $\Delta X$ is calculated as a value indicating the following relationship with respect to each operation state amount A. The wear of the bearing portion 28 becomes more severe as the rotation speed of the rotor shaft 24 increases, that is, the rotation speed A1 of the rotary electric machine 14 increases. Therefore, with respect to the rotation speed A1 of the rotary electric machine 14, the value of the update amount $\Delta X$ is calculated as a value that increases when the rotation speed A1 is high as compared to when the rotation speed A1 is low. On the other hand, the electronic control unit 15 decides output torque of the rotary electric machine 14 based on an amount of depression of an accelerator pedal or a vehicle speed, and decides a current flowing through a stator coil, that is, the current value A2 of the stator current the advance quantity A3 such that the output torque can be obtained. When the output torque of the rotary electric machine 14 is large, the torsional torque applied to the rotor shaft 24 is also large, and the wear of the bearing portion 28 becomes severe. In order to increase the output torque of the rotary electric machine 14, the current value of the stator current is needed to increase. Therefore, with respect to the current value A2 of the stator current, the value of the update amount $\Delta X$ is calculated as a value that increases when the same current value A2 is large as compared to when the same current value A2 is small. Further, in order to increase the output torque of the rotary electric machine 14, the advance quantity A3 of the stator current is needed to increase. Therefore, with respect to the advance quantity A3 of the stator current, the value of the update amount $\Delta X$ is calculated as a value that increases when the same advance quantity A3 is large as compared to when the same advance quantity A3 is small. Further, when a sufficient amount of the oil is not supplied to the bearing portion 28, lubrication is insufficient and the wear becomes severe. Therefore, with respect to the amount A4 of the oil supplied to the bearing portion 28, the value of the update amount $\Delta X$ is calculated as a value that decreases when the amount A4 of the oil supplied is large as compared to when the amount A4 of the oil supplied is small. Further, when the temperature A5 of the oil is low, the viscosity of the oil increases and the lubrication performance deteriorates. Therefore, with respect to the temperature A5 of the oil, the value of the update amount $\Delta X$ is calculated as a value that decreases when the temperature A5 is high as compared to when the temperature A5 is low.

Also, the update amount $\Delta X$ is calculated as a value indicating the following relationship with respect to the characteristic value C for deterioration degree calculation. The wear of the bearing portion 28 becomes more severe as the axial runout of the rotation of the rotor 22 is large. On the other hand, the mechanical imbalance amount C1 of the rotor 22 is an amount indicating the magnitude of the bias of the weight distribution around a rotation axis of the rotor 22, and the axial runout of the rotation of the rotor 22 is large as the above amount is large. Therefore, with respect to the mechanical imbalance amount C1 of the rotor 22, the value of the update amount $\Delta X$ is calculated as a value that increases when the mechanical imbalance amount C1 is large as compared to when the mechanical imbalance amount C1 is small. Further, the axial runout of the rotation of the rotor 22 increases as the variation amount C2 of the magnetic flux density between the magnetic poles increases. Therefore, with respect to the variation amount C2 of the magnetic flux density between the magnetic poles, the value of the update amount $\Delta X$ is calculated as a value that increases when the variation amount C2 is large as compared to when the variation amount C2 is small.

When the calculation of the update amount $\Delta X$ is performed in the above embodiment, the processing proceeds to step S130. In step S130, the value of the wear amount X is updated based on the update amount $\Delta X$. Specifically, the value of the wear amount X is updated such that the sum of the value before the update and the update amount $\Delta X$ is the value after the update. Then, in subsequent step S140, the determination is made as to whether or not the value of the wear amount X after the update is a value of the difference or more obtained by subtracting a predetermined margin $\Delta$ from the allowable limit value Z. In a case where the wear amount X is a value of the difference (Z–$\Delta$) or more obtained by subtracting the predetermined margin $\Delta$ from the allowable limit value Z (S140: YES), in step S150, the life predicting device 16 outputs an instruction signal for instructing turning on of the warning light 19A to the instrument panel 19. On the other hand, in a case where the wear amount X is a value less than the difference (Z–$\Delta$) obtained by subtracting the predetermined margin $\Delta$ from the allowable limit value Z (S140: NO), in step S160, the life predicting device 16 outputs an instruction signal for instructing turning off of the warning light 19A to the instrument panel 19. Then, the life predicting device 16 finishes the processing in the current control cycle after outputting the instruction signal in step S150 or step S160. In the present embodiment, the processing of steps S100 and S110 in the flowchart of FIG. 3 corresponds to the acquisition processing, the processing of steps S120 and S130 corresponds to the calculation processing, and the processing of steps S140 to S160 corresponds to the output processing, respectively.

Operation and Effect of First Embodiment

The operation and effect of the present embodiment will be described.

There is individual difference in the interference margin between the stator 21 and the rotor core 23 in the rotary electric machine 14 due to the processing variation, and an upper limit value of an allowable wear amount X of the bearing portion 28 differs for each individual. In the present embodiment, at the manufacturing plant of the rotary electric machine 14, the size of the interference margin in the state immediately after the rotary electric machine 14 is manufactured is measured as the allowable limit value Z of the wear amount X for each individual rotary electric machine 14. Then, at the time of assembly of the hybrid vehicle 10, the allowable limit value Z of the individual rotary electric machine 14 that is the target of the life prediction by the life predicting device 16, that is, the rotary electric machine 14 of the vehicle on which the life predicting device 16 is mounted is stored in the memory 18 of the life predicting device 16. Then, in the life predicting device 16 according to the present embodiment, when the current wear amount X of the bearing portion 28 estimated from the operation state amount A and the like of the rotary electric machine 14 approaches the allowable limit value Z, the warning light 19A of the instrument panel 19 is turned on to give a warning to the user that the rotary electric machine 14 reaches the end of its life and maintenance is needed. That is, in the present embodiment, the life prediction for the rotary electric machine 14 is performed in a form in which the individual difference of the allowable limit value Z of the wear amount X is reflected for each individual rotary electric machine 14.

Also, there is the individual difference in an amount of axial runout of the rotor 22 in the rotary electric machine 14 due to the processing variation, and thus even in a case where the operating condition is the same, there is individual difference in the progress rate of the wear of the bearing portion 28. On the other hand, in the present embodiment, at the manufacturing plant of the rotary electric machine 14, the mechanical imbalance amount C1 of the rotor 22 in the state immediately after the rotary electric machine 14 is manufactured and the variation amount C2 in the magnetic flux density between the magnetic poles are measured for each individual rotary electric machine 14. Then, these measured values are stored in the memory 18 and used for calculating the wear amount X. That is, in the life predicting device 16 according to the present embodiment, the wear amount X is calculated in a form in which the individual difference in the amount of the axial runout amount of the rotor 22 due to the processing variation is reflected.

With the life predicting device 16 for the vehicle component according to the present embodiment described above, the following effects can be obtained.

(1) In the present embodiment, the operation state amount A of the rotary electric machine 14 is acquired, and the wear amount X of the bearing portion 28 is calculated from the operation state amount A. Then, based on the calculated wear amount X and the allowable limit value Z stored in advance in the memory 18, the necessity determination of maintenance of the rotary electric machine 14 is performed, and the instruction signal of turning off or turning on of the warning light 19A is output to the instrument panel 19 in accordance with the determination result. The value of the allowable limit value Z stored in the memory 18 is a value obtained from a measurement result of the interference margin between the stator 21 and the rotor core 23 for the individual rotary electric machine 14 that is the target of the life prediction by the life predicting device 16, that is, the rotary electric machine 14 mounted on the vehicle on which the life predicting device 16 is mounted. Therefore, in the life predicting device 16, the necessity determination of maintenance is performed in a form in which the individual difference of the interference margin in the state immediately after the rotary electric machine 14 is manufactured is reflected. Therefore, with the life predicting device for the vehicle component according to the present embodiment, the accuracy of the necessity determination of maintenance of the rotary electric machine 14 based on the life prediction result can be improved.

(2) In the present embodiment, the mechanical imbalance amount C1 of the rotor 22 in the state immediately after the rotary electric machine 14 is manufactured and the variation amount C2 of the magnetic flux density between the magnetic poles provided in the rotor 22 are measured. Further, these measured values are stored in the memory 18 and used for calculating the wear amount X. Accordingly, the individual difference in the amount of axial runout of the rotor 22 due to the processing variation can be reflected in the calculation of the wear amount X. As a result, the calculation accuracy of the wear amount X and the accuracy of the necessity determination of maintenance of the rotary electric machine 14 by using the calculated value can be improved.

Second Embodiment

Hereinafter, a second embodiment of the life predicting device for the vehicle component will be described in detail with reference to FIGS. 4. In the present embodiment, the same reference numerals are given to the configurations common to the embodiment described above, and detailed description thereof will be omitted.

Even in a case where notification is given, by turning on of warning light 19A, that maintenance of the rotary electric machine 14 is needed, it is not always a status in which the vehicle can be brought into maintenance immediately. Therefore, a sufficient grace period is needed from turning on of the warning light 19A until the rotary electric machine 14 actually reaches the end of its life. The length of the grace period can be adjusted to some extent by the value of the margin Δ used for the determination in step S140 in the flowchart of FIG. 3. However, even in a case where the value of the margin Δ is fixed, when the progress rate of the wear of the bearing portion 28 after the warning light 19A is turned on, that is, the increase rate of the wear amount X is high, the grace period is short.

On the other hand, in the present embodiment, the margin Δ is a variable value set based on an increase rate V as a value that increases when the increase rate V of the wear amount X is large as compared to when the increase rate V is small. When the increase rate V of the wear amount X is high in the period until the warning light 19A is turned on, there is a high possibility that the state in which the increase rate V is high continues even after the warning light 19A is turned on. Therefore, in a case where the margin Δ is variably set in accordance with the increase rate V, a sufficient grace period can be easily secured.

Figure 4:
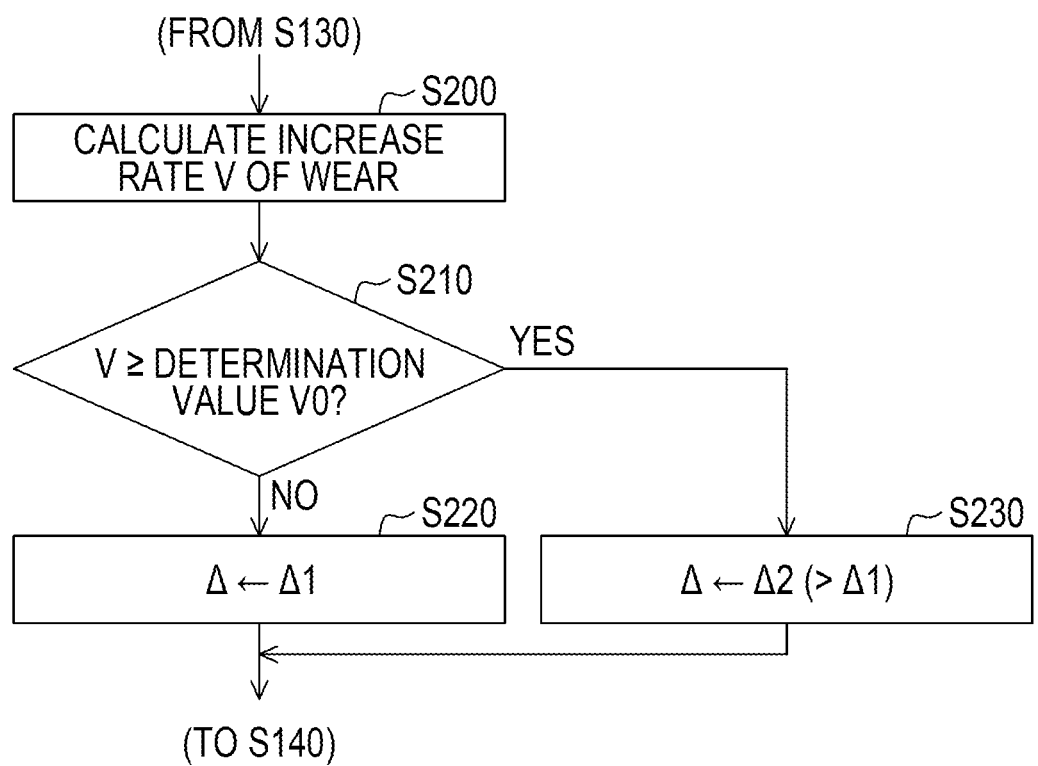
FIG. 4 is a flowchart of processing executed by a life predicting device for a vehicle component according to a second embodiment.

FIG. 4 shows processing additionally executed between the processing of step S130 and the processing of step S140 in the flowchart of FIG. 3 in the life predicting device according to the present embodiment. That is, in the present embodiment, after the calculation of the wear amount X in step S130 of FIG. 3, the processing proceeds to step S200 of FIG. 4. When the processing proceeds to step S200, the increase rate V of the wear amount X is calculated in step S200. In the present embodiment, the amount of increase in the wear amount X in a traveling period of the hybrid vehicle 10 at the latest specified distance is calculated as the value of the increase rate V. Therefore, in the present embodiment, the calculated value of the wear amount X in the traveling period of the hybrid vehicle 10 at the latest specified distance is stored in the memory 18. Thereafter, in subsequent step S210, the determination is made whether or not the calculated increase rate V is a value of a predetermined determination value V0 or more. Then, in a case where the increase rate V is less than the determination value V0 (NO), a predetermined value Δ1 is set as the value of the margin Δ in step S220, and then the processing proceeds to step S140 of FIG. 3. On the other hand, in a case where the increase rate V is the determination value V0 or more (YES), a predetermined value Δ2 that is more than Δ1 is set as the value of the margin Δ in step S230, and then the processing proceeds to step S140 of FIG. 3.

As the increase rate V of the wear amount X used for setting the margin Δ, a value obtained by dividing the current wear amount X by a traveling distance of the hybrid vehicle 10 from the time when the rotary electric machine 14 is assembled into the vehicle or by the operation time of the rotary electric machine 14 may be used. Further, the margin Δ may be variably set as a value that changes in three or more stages with respect to the increase rate V, or a value that continuously changes in accordance with the increase rate V.

Other Embodiments

The embodiment described above can be modified and implemented as follows. The present embodiment and the following modification examples can be implemented in combination with each other within a technically consistent range.

In the embodiment described above, the mechanical imbalance amount C1 of the rotor 22 and the variation amount C2 of the magnetic flux density between the magnetic poles are used as the characteristic value C for deterioration degree calculation. Other individual characteristic values of the rotary electric machine 14 that are the characteristic values affect the progress degree of the wear may be used as the characteristic value C for deterioration degree calculation. For example, in a case where there are the processing variation in a surface roughness and hardness of the bearing portion 28 in the rotor shaft 24, these differences may affect the progress degree of the wear of the bearing portion 28. Therefore, in such a case, in addition to or instead of the mechanical imbalance amount C1 of the rotor 22 and the variation amount C2 of the magnetic flux density between the magnetic poles, the measured values of the surface roughness and hardness of the bearing portion 28 may be used as the characteristic value C for deterioration degree calculation.

In the embodiment described above, the wear amount X of the bearing portion 28 is calculated based on the operation state amount A of the rotary electric machine 14 and the characteristic value C for deterioration degree calculation. In a case where the individual difference in the progress degree of the wear of the bearing portion 28 is not so large, the wear amount X may be calculated based solely on the operation state amount A without using the characteristic value C for deterioration degree calculation. In that case, the measurement of the characteristic value C for deterioration degree calculation for each individual rotary electric machine 14 and the storage of the measured value in the memory 18 can be omitted.

In the embodiment described above, as the operation state amount A of the rotary electric machine 14 used for calculating the wear amount X, the rotation speed A1 of the rotary electric machine 14, the current value A2 and the advance quantity A3 of the stator current, the amount A4 of the oil supplied, and the temperature A5 of the oil are used. A part of these values may be omitted from the operation state amount A used for calculating the wear amount X. Also, other parameters that affect the wear of the bearing portion 28, such as the output torque of the rotary electric machine 14, may be added to the operation state amount A used for calculating the wear amount X.

About Vehicle Component

The life predicting device 16 according to the embodiment described above and the rotary electric machine 14 that is the target thereof are mounted on the hybrid vehicle 10, but the life predicting device 16 and the rotary electric machine 14 may be mounted on the electric vehicle.

The life predicting device 16 may be configured to predict the life due to the wear of the vehicle component other than the rotary electric machine 14 as a target. In some cases, the wear amount X of a specific part of the vehicle component can be predicted from the operation state amount A of the vehicle component. On the other hand, the wear amount X has an allowable upper limit amount, and the upper limit amount may be obtained from the measurement result of the dimensional shape of each part of the vehicle component. In such a case, the allowable limit value Z of the wear amount X in the state immediately after the vehicle component is manufactured is obtained for each individual from such a measurement result, and the allowable limit value Z of the individual vehicle component that is the target of the life prediction by the life predicting device 16 is stored in the memory 18. Then, based on the allowable limit value Z stored in the memory 18 and the wear amount X calculated from the operation state amount A of the vehicle component, the life of the vehicle component can be predicted in a form in which the individual difference of the allowable limit value Z of the wear amount X due to the processing variation is reflected.

About Type of Aged Deterioration

In the embodiment described above, the aged deterioration of the vehicle component due to the mechanical wear has been described, but the life of the vehicle component may be predicted for the aged deterioration due to the wear of other forms, such as erosion or corrosion. The life predicting device can be configured to predict the life of vehicle component due to the aged deterioration other than the wear, such as stress corrosion cracking, fatigue, and creep. Here, a value indicating the progress degree of the aged deterioration is defined as the deterioration degree of vehicle component. For any aged deterioration, in a case where the value of the deterioration degree when the vehicle component reaches the end of its life due to the aged deterioration can be obtained from the measurement result of the dimensional shape or a material for each individual, the allowable limit value Z can be obtained from the measurement result of each individual vehicle component before being assembled into the vehicle. Then, when the allowable limit value Z is stored in the memory 18, based on the deterioration degree of the vehicle component obtained from the operation state amount A and the allowable limit value Z stored in the memory 18, the life of the vehicle component can be predicted in a form in which the individual difference due to the processing variation is reflected.

For example, the fatigue strength of each individual vehicle component can be obtained from the measurement results of the density of internal defects or internal cracks by non-destructive inspection, and residual stress. Therefore, when the life due to the fatigue of vehicle component is predicted, the fatigue strength in the state immediately after each individual vehicle component is manufactured may be measured and the allowable limit value Z of each individual may be set from the measurement result.

About Installation Location of Life Predicting Device

In the embodiment described above, the life predicting device 16 is mounted on the vehicle into which the vehicle component that is the target of the life prediction are assembled, but the life predicting device 16 may be installed in a data center or the like outside the vehicle. In the data center in this case, a data storage that stores the allowable limit value Z of each vehicle and the characteristic value C for deterioration degree calculation is provided as the storage device. Further, the data center is provided with a calculation processing device as the execution device. Then, the calculation processing device is connected to the electronic control unit of each vehicle under control to be able to transmit and receive data through a wireless communication network or the like. In such a case, the calculation processing device acquires vehicle identification information and the operation state amount A of the vehicle component from the electronic control unit of the vehicle, and acquires the allowable limit value Z of the vehicle and the characteristic value C for deterioration degree calculation from the data storage based on the acquired identification information. Then, the calculation processing device calculates the deterioration degree of the vehicle component of the vehicle from the acquired operation state amount A and the characteristic value C, performs the necessity determination of maintenance based on the calculated value and the allowable limit value Z of the vehicle, and transmits the determination result to the vehicle.

In the output processing in the embodiment described above, the determination result of whether or not the vehicle component reaches the end of its life and maintenance is needed is generated as the information regarding the life of the vehicle component and output to the instrument panel 19. The remaining life of vehicle component, the predicted value of the time when the vehicle component reaches the end of its life, and the like may be generated as the information regarding the life of vehicle component. Also, the generated information may be used for purposes other than turning on and turning off the warning light 19A. For example, the information regarding the life of the vehicle component can be used for life extension control of the vehicle component that changes the control content of the vehicle such that the load applied to the vehicle component is reduced and the progress of the aged deterioration is suppressed. The life extension control of the rotary electric machine 14 of the hybrid vehicle 10 is performed by changing the torque distribution of the engine 11 and the rotary electric machine 14 such that the output torque of the engine 11 increases and the output torque of the rotary electric machine 14 is reduced accordingly.

What is claimed is:

1. A life predicting device for a vehicle component that predicts a life of a vehicle component that is a component of a vehicle, the life predicting device comprising:
    an execution device; and
    a storage device, wherein:
        in a case where a value indicating a progress degree of aged deterioration of the vehicle component is defined as a deterioration degree, a value of the deterioration degree when the vehicle component reaches an end of the life is defined as an allowable limit value of the deterioration degree, and a value indicating a characteristic of each individual vehicle component is defined as an individual characteristic value,
        a value of the allowable limit value obtained from a measurement result of the individual characteristic value of the individual vehicle component that is a target of life prediction by the life predicting device is stored in the storage device in advance,
        the individual characteristic value includes a characteristic value for allowable limit value calculation used for calculating the allowable limit value and a characteristic value for deterioration degree calculation used for calculating the deterioration degree,
        a value of the characteristic value for deterioration degree calculation measured before the vehicle component is assembled into the vehicle is stored in the storage device in advance,
        the execution device executes
            acquisition processing of acquiring an operation state amount of the vehicle component in the vehicle,
            calculation processing of calculating the value of the deterioration degree based on a value of the operation state amount and the characteristic value for deterioration degree calculation, and
            output processing of generating information regarding the life of the vehicle component based on the deterioration degree and the allowable limit value and outputting the generated information, wherein:
            when a wear amount is greater than or equal to a predetermined amount, the execution device outputs a signal that activates a warning light in the vehicle, and
            when the wear amount is less than the predetermined amount, the execution device outputs a signal that deactivates the warning light in the vehicle,
        the vehicle component is a magnet-embedded rotary electric machine;
        the wear amount of a bearing portion of a rotor of the rotary electric machine is used as the deterioration degree;
        an interference margin between a stator of the rotary electric machine and the rotor is used as the characteristic value for allowable limit value calculation; and
        an imbalance amount of the rotor and a variation amount of a magnetic flux density between magnetic poles provided in the rotor are used as the characteristic value for deterioration degree calculation.

2. The life predicting device according to claim 1, wherein:
    in the output processing, a result of necessity determination of maintenance of the vehicle component is output as the information regarding the life; and
    the necessity determination is performed by setting a difference obtained by subtracting a margin from the allowable limit value as a determination threshold value, determining that maintenance is needed in a case where the value of the deterioration degree is the determination threshold value or more, and determining that maintenance is not needed in a case where the value of the deterioration degree is less than the determination threshold value.

3. The life predicting device according to claim 2, wherein the margin is a variable value set based on an increase rate of the deterioration degree as a value that increases when the increase rate is large as compared to when the increase rate is small.

4. The life predicting device according to claim 1, wherein values of an inner diameter of the stator, an outer diameter of the rotor core, and a coaxiality of the stator and the rotor core are used as the characteristic value for allowable limit value calculation.

\* \* \* \* \*